(12) United States Patent
Mathai et al.

(10) Patent No.: US 10,976,508 B2
(45) Date of Patent: Apr. 13, 2021

(54) OPTICAL MODULES

(71) Applicant: HEWLETT PACKARD ENTERPRISE DEVELOPMENT LP, Houston, TX (US)

(72) Inventors: Sagi Varghese Mathai, Sunnyvale, CA (US); Wayne Victor Sorin, Mountain View, CA (US); Michael Renne Ty Tan, Menlo Park, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 17 days.

(21) Appl. No.: 15/546,266

(22) PCT Filed: Jan. 30, 2015

(86) PCT No.: PCT/US2015/013749
§ 371 (c)(1),
(2) Date: Jul. 25, 2017

(87) PCT Pub. No.: WO2016/122586
PCT Pub. Date: Aug. 4, 2016

(65) Prior Publication Data
US 2018/0329159 A1 Nov. 15, 2018

(51) Int. Cl.
*G02B 6/42* (2006.01)
*G02B 6/38* (2006.01)

(52) U.S. Cl.
CPC .......... *G02B 6/423* (2013.01); *G02B 6/3897* (2013.01); *G02B 6/4206* (2013.01); *G02B 6/4214* (2013.01); *G02B 6/4215* (2013.01); *G02B 6/4259* (2013.01); *G02B 6/4269* (2013.01); *G02B 6/4246* (2013.01); *G02B 6/4274* (2013.01)

(58) Field of Classification Search
CPC .... G02B 6/423; G02B 6/4259; G02B 6/3897; G02B 6/4206; G02B 6/4214; G02B 6/4215; G02B 6/4269; G02B 6/4246; G02B 6/4274
See application file for complete search history.

(56) References Cited

U.S. PATENT DOCUMENTS

| | | | | | |
|---|---|---|---|---|---|
| 4,421,383 | A | * | 12/1983 | Carlsen | G02B 6/32 385/72 |
| 5,031,993 | A | * | 7/1991 | Asthana | G11B 11/10543 385/27 |
| 5,044,718 | A | * | 9/1991 | Kando | G02B 6/34 369/44.32 |

(Continued)

OTHER PUBLICATIONS

Li et al., Unidirectionally optical coupling from free space into silicon waveguide with wide flat-top angular efficiency, Optics Express, V. 20, N. 17, 2012, p. 18545 (Year: 2012).*

(Continued)

*Primary Examiner* — Peter Radkowski
(74) *Attorney, Agent, or Firm* — Sheppard Mullin Richter & Hampton LLP (57) ABSTRACT

Optical modules are disclosed. An example optical module includes a substrate comprising a grating coupler, an optical connector removably coupled to the substrate adjacent the grating coupler to optically couple the optical connector and the grating coupler and an integrated circuit coupled to the substrate.

22 Claims, 7 Drawing Sheets

(56) References Cited

U.S. PATENT DOCUMENTS

| | | | | | |
|---|---|---|---|---|---|
| 5,070,488 | A | * | 12/1991 | Fukushima | G02B 6/124 359/571 |
| 5,621,715 | A | * | 4/1997 | Ohyama | G02B 6/124 369/103 |
| 5,631,988 | A | * | 5/1997 | Swirhun | G02B 6/245 385/89 |
| 5,684,900 | A | * | 11/1997 | Nishiwaki | G02B 6/34 369/44.12 |
| 6,012,852 | A | * | 1/2000 | Kadar-Kallen | G02B 6/32 385/74 |
| 6,095,697 | A | * | 8/2000 | Lehman | G02B 6/423 385/88 |
| 6,646,744 | B2 | * | 11/2003 | Pedersen | G02B 5/1819 250/237 G |
| 6,801,693 | B1 | * | 10/2004 | Jacobowitz | G02B 6/2826 385/14 |
| 6,992,770 | B2 | * | 1/2006 | Naya | G01N 21/553 356/445 |
| 7,339,681 | B2 | * | 3/2008 | Su | G01N 21/21 356/491 |
| 8,267,583 | B2 | * | 9/2012 | Yao | G02B 6/13 384/31 |
| 8,611,747 | B1 | * | 12/2013 | Wach | H04J 14/02 398/79 |
| 8,768,123 | B2 | * | 7/2014 | Yao | G02B 6/13 385/18 |
| 9,122,015 | B2 | * | 9/2015 | Shimizu | G02B 6/124 |
| 9,664,858 | B2 | * | 5/2017 | Mohammed | G02B 6/36 |
| 10,078,190 | B2 | * | 9/2018 | Doerr | G02B 6/30 |
| 2002/0044285 | A1 | * | 4/2002 | Pedersen | G02B 5/1819 356/445 |
| 2002/0126290 | A1 | * | 9/2002 | Naya | G01N 21/553 356/445 |
| 2004/0156590 | A1 | * | 8/2004 | Gunn, III | G02B 6/1228 385/37 |
| 2006/0119859 | A1 | * | 6/2006 | Su | G01N 21/21 356/495 |
| 2007/0258213 | A1 | * | 11/2007 | Chen | F28D 15/0233 361/701 |
| 2011/0091157 | A1 | * | 4/2011 | Yao | G02B 6/13 385/42 |
| 2012/0155805 | A1 | * | 6/2012 | Doerr | G02B 6/30 385/37 |
| 2012/0155806 | A1 | * | 6/2012 | Doerr | G02B 6/29323 385/37 |
| 2012/0224810 | A1 | * | 9/2012 | Doerr | G02B 6/124 385/37 |
| 2012/0321251 | A1 | * | 12/2012 | Yao | G02B 6/12002 385/42 |
| 2013/0121639 | A1 | * | 5/2013 | Shimizu | G02B 6/34 385/37 |
| 2013/0182998 | A1 | * | 7/2013 | Andry | G02B 6/4204 385/33 |
| 2013/0209020 | A1 | * | 8/2013 | Doerr | G02F 1/011 385/2 |
| 2013/0209112 | A1 | * | 8/2013 | Witzens | G02B 6/2813 398/214 |
| 2013/0230274 | A1 | * | 9/2013 | Fish | G02B 6/305 385/14 |
| 2014/0029888 | A1 | * | 1/2014 | La Porta | H05K 13/00 385/2 |
| 2014/0177625 | A1 | * | 6/2014 | Chang | G02B 6/43 370/351 |
| 2014/0177995 | A1 | * | 6/2014 | Mohammed | G02B 6/4214 385/14 |
| 2014/0193115 | A1 | * | 7/2014 | Popovic | G02B 6/34 385/14 |
| 2014/0321803 | A1 | * | 10/2014 | Thacker | G02B 6/4274 385/14 |
| 2014/0334781 | A1 | * | 11/2014 | Fiorentino | G02B 6/3882 385/78 |
| 2016/0341895 | A1 | * | 11/2016 | Bienstman | G02B 6/34 |

OTHER PUBLICATIONS

Luo et al., Light trapping and surface plasmon enhanced high-performance NIR photodetector, Scientific Reports, 2014, 4:3914, DOI: 10.1038/srep03914, p. 1 (Year: 2014).*

Edward Palen, "Surface Mount Optical Interconnects," Integrated Optoelectronic Devices, 2008, International Society for Optics and Photonics, 5 pages, http://home.comcast.net/~zbyte/6899-9.PhotonicsWest.pdf.

International Search Report & Written Opinion received in PCT Application No. PCT/US2015/013749, dated Oct. 26, 2015, 11 pages.

* cited by examiner

OPTICAL MODULES

BACKGROUND

Some optical circuits (e.g. waveguides) fabricated on a substrate are directly coupled (e.g., pigtail coupling) to an optical fiber using an optical adhesive. The coupling enables light to be transmitted between the optical circuit and the optical fiber permanently attached to the substrate.

The figures are not to scale. Instead, to clarify multiple layers and regions, the thickness of the layers may be enlarged in the drawings. Wherever possible, the same reference numbers will be used throughout the drawing(s) and accompanying written description to refer to the same or like parts. As used in the specification and claims herein, the singular forms "a," "an," and "the" include plural referents unless the context clearly dictates otherwise. In other words, in the specification and claims herein, the singular forms "a," "an," and "the" are used to indicate "one or more" unless the context clearly dictates otherwise.

DETAILED DESCRIPTION

The examples disclosed herein relate to optical modules having relatively relaxed alignment tolerances between an optical fiber(s) and a substrate including an optical circuit. The example optical modules may include an optical circuit fabricated on a substrate, an integrated circuit, a heat sink and/or grating couplers, and all associated mechanical parts. The substrate may be a silicon on insulator wafer. The substrate may include grating couplers, lenses, prisms, passive optical waveguides, lasers, optical modulators and/or photodetectors, etc.

The example grating couplers are configured to efficiently couple light between optical circuits and example removable expanded beam fiber optical connectors. In some examples, the grating coupler and the optical connectors produce expanded and/or collimated optical beams. The optical connectors may at least partially house a respective optical fiber and/or collimating lens. The optical fiber may be a single mode optical fiber, a multicore optical fiber, and/or a multimode optical fiber. The example grating couplers may be configured to expand and deflect light (e.g., between about a 50-200 micrometers (μm) light beam) out of a plane of the substrate and/or receive and turn light from the expanded beam optical connector into the plane of the substrate.

In some instances, the optical connector may not be robust enough to be exposed to some procedures that the substrate may undergo such as, for example, a flip chip solder reflow procedure. To enable the substrate to undergo these procedures, examples disclosed herein enable removably coupling the optical connectors to the substrate using mating and/or alignment structures. The example mating structures may be any suitable structure such as a male and/or female portion(s) on the substrate that receive and/or interact with a corresponding male and/or female portion(s) on the optical connector. In some examples, the mating structure is a single structure. In other examples, the mating structure is a pair or more than one structure. Structures of the male and/or female portions may be formed (e.g., precisely formed) on the substrate to enable the precise alignment of the grating couplers, lenses, etc. using lithographic processes and/or any other suitable manufacturing process.

In some examples, the mating structures disclosed herein mechanically and/or optically couple (e.g., optomechanically coupled) the substrate to the optical connector and the optical fiber by aligning the optical connector with the optical circuit based on complementary mating structures of the optical connector and the substrate. The optical fiber may be passively aligned along all six axes, aligned along the x-axis, aligned along the y-axis and/or aligned along the z-axis, etc.

Optical insertion loss may occur between the optical connector and optical circuit. To reduce insertion loss between the optical circuit and the optical connector, in some examples disclosed herein, the mating structures on the substrate and/or the optical connector include standoffs that create a suitable spacing between the substrate and the optical connector to minimize and/or reduce the insertion loss. In some examples, to increase an alignment tolerance to effectively couple light entering/exiting the optical circuits and the optical connector, one or more collimating lenses are disposed on the substrate and/or the optical connector. In some examples, the optical module is designed to minimize and/or reduce optical insertion loss caused by transverse and angular placement error and/or misalignment.

In some of the illustrated examples, to facilitate directing (e.g., guiding, turning) light as it enters and/or exits the optical circuits, the optical connector and/or the substrate are oriented and/or include a portion and/or surface to tilt and/or turn the light beam(s). For example, to turn the light to enter the plane of the substrate, the optical fibers and the light path in the optical connector may be positioned at a non-perpendicular angle relative to the grating couplers such that light beams exiting the optical connector are at a non-perpendicular angle relative to a plane of the substrate. In other examples, to turn the light to enter the plane of the substrate, the optical connector may be substantially perpendicular to the plane of the substrate but the optical axis of light beams exiting the optical connector may be offset relative to the optical axis of a collimating lens of the substrate and/or the optical connector.

In other examples, to turn the light to enter the plane of the substrate, a surface of the substrate and/or a surface of the optical connector may be non-parallel relative to one another to, for example, tilt light beams at a non-perpendicular angle relative to the substrate. Although the orientation of the light beams and the optical connector may be non-perpendicular relative to the substrate plane, in some examples, the mechanical mating features and the engagement between these mating features are substantially perpendicular relative to the substrate plane. However, the mechanical mating features may be differently oriented and/or non-perpendicular relative to the substrate plane.

In some examples, a first surface of the substrate may be designated and/or configured to receive an integrated circuit and/or a heat sink. In some examples, a second surface of the wafer opposing the first surface may be designated and/or configured to be coupled to an example optical connector(s) and/or to be coupled to an organic package, a printed circuit board, a flex circuit, etc. In such examples, a larger heat sink may be used to engage a larger surface area of the first surface to promote increased cooling of the integrated circuit and optical circuits by transferring more heat from the integrated circuit and the substrate to the heat sink through the larger surface area. Further, by providing the first surface with grating couplers and the second surface with metal pads and/or solder bumps, the example circuit may be tested optically and/or electrically at, for example, grating couplers on the first surface of the substrate and/or metal pads and/or solder bumps on the second surface of the substrate to ensure operability of the optical circuit and/or the integrated circuit, for example. In some examples, the first surface includes metal pads and/or solder bumps to enable electrical testing of the optical circuits prior to attachment of the IC at the wafer level. By positioning the fiber optical connectors on the second surface of the substrate, the grating coupler(s) is exposed and accessible by test equipment or a test probe even when the optical connector is coupled to the substrate, for example.

To increase a light transmission efficiency of the grating couplers and/or to deflect light into the substrate when the fiber optical connector is disposed on the second surface of the wafer, a reflector may be disposed over the grating couplers. The reflector may include silicon dioxide, metal (e.g., gold, silver), a dielectric material and/or a distributed Bragg reflector. The reflector may be orientated parallel or non-parallel to the grating coupler and/or optical connector. To reduce reflections at an interface (e.g., an air interface) between the substrate and the optical connector, in some examples, a coating may be disposed at the interface (e.g., disposed on the substrate). The coating may be an antireflective coating.

In other examples, the substrate is configured to accept optical connectors on a first surface area (e.g., a left surface area) of the substrate, and an integrated circuit and a corresponding heat sink on a second surface area (e.g., a right surface area) of the substrate distally located from the first surface area of the substrate. In some such examples, the heat sink may be cantilevered from the substrate to increase the size of the heat sink and to promote increased cooling effectiveness of the integrated circuit, the substrate, etc.

Figure 1:
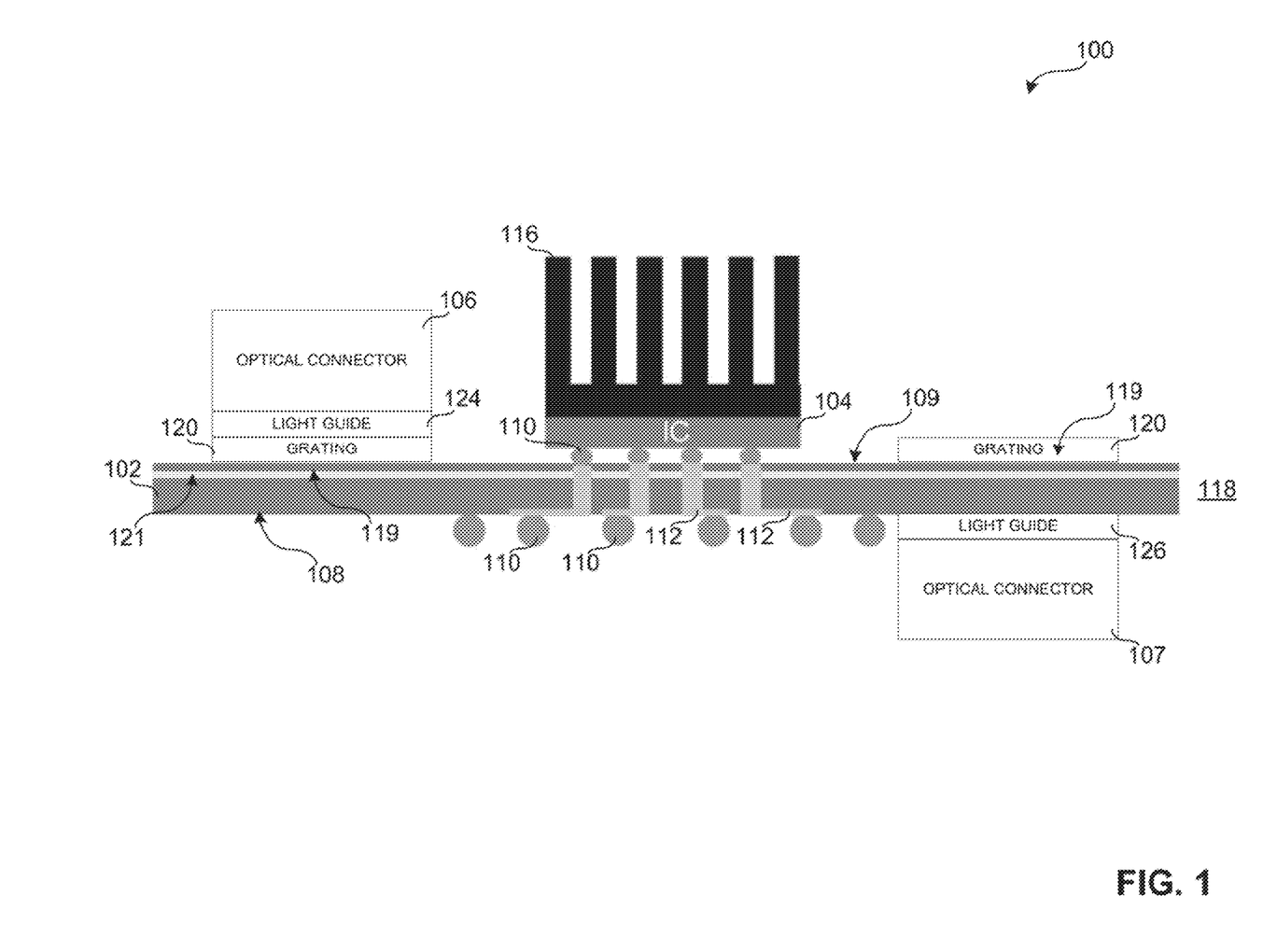
FIG. 1 illustrates an example optical module including example optical connectors.

FIG. 1 illustrates an example optical module 100 including a substrate 102 on which an integrated circuit (IC) 104 and first and second optical connectors 106, 107 are disposed. The IC 104 may be in communication with the optical circuits. As shown in FIG. 1, the first and second optical connectors 106, 107 are disposed on opposing surfaces 108, 109 of the substrate 102. However, in other examples, the first and second optical connectors 106, 107 are disposed on the same surface 108 or the same surface 109 of the optical module 100 (see, e.g., FIGS. 8-11) and/or are disposed immediately adjacent one another (see, e.g., FIG. 12). Without limitation, the optical connectors 106, 107 may include a single optical fiber, optical fiber arrays, a single multicore optical fiber, or multiple multicore optical fibers.

In the illustrated example of FIG. 1, solder bumps 110 are used to couple (e.g., electrically couple) the integrated circuit 104 to the substrate 102. As shown in the example of FIG. 1, electrically conductive through-silicon vias (TSVs) and/or traces 112 extend through the substrate 102 and/or surfaces 108, 109 to enable the integrated circuit 104 and/or the optical circuits to be placed in communication with other devices adjacent the opposing bottom or first surface 108 of the optical module 100. The other devices may include another integrated circuit, a discrete electronic component, an organic substrate and/or a larger printed circuit board, etc. Additionally or alternatively, the traces 112 can provide electrical communication to optical circuits and/or other devices on the substrate 102.

In the illustrated example of FIG. 1, to cool the integrated circuit 104 and/or other components of the optical module 100, a heat sink 116 is coupled to the integrated circuit 104. The example heat sink 116 may be larger and/or smaller than illustrated in FIG. 1. For example, the heat sink 116 may at least partially encapsulate the integrated circuit 104 (see FIG. 9). Additionally or alternatively, in examples in which the integrated circuit 104 is disposed immediately adjacent another surface 118 of the optical module 100 (e.g., a third surface or an edge of the optical module 100), the heat sink 116 may extend off of and/or be cantilevered from the substrate 102 and/or the integrated circuit 104 (see, e.g., FIG. 12). Without limitation, the integrated circuit 104 may include logic functions, laser drivers, modulator drivers and/or a transimpedance amplifier (TIA), for example.

In the example of FIG. 1, the substrate 102 is a silicon on insulator wafer having optical circuits 119, such as grating couplers 120, fabricated on the second surface 109 of the substrate 102. In this example, the substrate 102 includes a buried Oxide (BOX) layer 121. However, in other examples, the substrate 102 may not include the BOX layer 121. To efficiently couple light within a high alignment tolerance into a plane of the substrate 102 (e.g., a plane along a length or width of the substrate 102), a first light guide 124 is disposed between the grating couplers 120 and the first optical connector 106 and a second light guide 126 is disposed between the substrate 102 and the second optical connector 107. The first light guide 124 may be integral to and/or included with the first optical connector 106 and/or the substrate 102 and/or the second light guide 126 may be integral to and/or included with the second optical connector 107 and/or the substrate 102.

The first and/or second light guides 124, 126 may include a fiber optical cable(s) that is disposed at a non-perpendicular angle relative to the grating coupler(s) 120 that guides (e.g., tilts, turns) the light as the light enters the substrate 102. Additionally or alternatively, the first and/or second light guides 124, 126 may include a fiber optical cable(s) that is offset relative to an optical axis of a lens (e.g., a collimating lens) that tilts the light at a non-perpendicular angle to the substrate 102 as the light enters the substrate 102. In some examples, the lens may be coupled to the substrate 102, and/or the respective optical connectors 106, 107. Additionally or alternatively, the first and/or second light guides 124, 126 may include lenses that guide (e.g., turn, tilt) the light as the light enters the substrate 102, and/or the first and/or second light guides 124, 126 may include a surface of the substrate 102 and/or optical connector(s) 106, 107 that is disposed at a non-parallel angle relative to the plane of the substrate 102 to tilt the light beams at a non-perpendicular angle relative to the grating couplers 120.

The first and/or second optical connectors 106, 107 of the illustrated example may be coupled to the substrate 102 using one or more mating structures. Example corresponding and opposing mating structures of the optical connectors 106, 107 and the grating couplers 120 and/or the substrate 102 intermesh or interconnect with one another at particular positions to passively align optical fibers in the optical connectors 106, 107 with the grating couplers 120 and/or the substrate 102 within a threshold tolerance so that the grating couplers 120 and/or the substrate 102 and the optical connectors 106, 107 form an optical coupling. The optical fibers may be a single mode optical fiber or a multimode optical fiber, for example.

Different example mating structures and/or interconnecting alignment structures such as shown in FIGS. 2-7 may be used to couple the optical connectors 106, 107 and the substrate 102. The mechanical mating features on the substrate 102 and/or optical connectors 106, 107 may include standoffs. In some examples, the mechanical mating features may be implemented using, but not limited to, injection molding, photopatterned polymers, metal electroplating, wafer bonding, etching, pick and place operations, etc.

Figure 2:
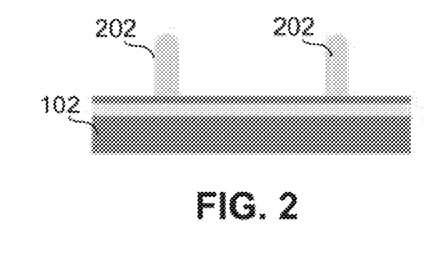
FIG. 2-7 illustrate example mating structures that can be used to couple the example optical connectors and the example substrate of FIG. 1.
Figure 3:
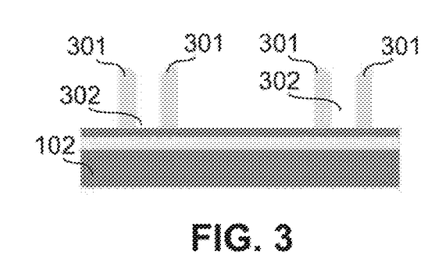

As shown in the example of FIG. 2, pillars and/or elongated portions or protrusions 202 may be formed on the substrate 102 that are to be received in corresponding apertures of the first and/or second optical connectors 106, 107 to couple the substrate 102 and the optical connectors 106, 107. As shown in the example of FIG. 3, protrusions or pillars 301 may be formed on the substrate 102 to form apertures 302 into which pillars and/or elongated portions of the optical connectors 106, 107 are to be received to couple the substrate 102 to the optical connectors 106, 107.

Figure 4:
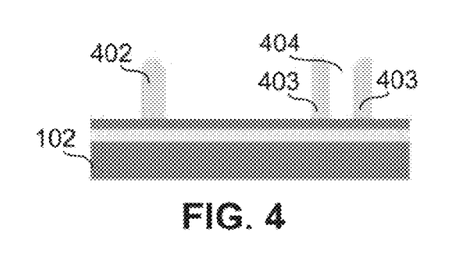
Figure 5:
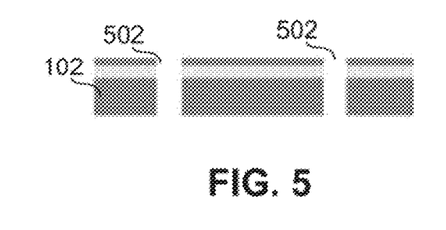

As shown in the example of FIG. 4, a pillar and/or elongated portion 402 may be formed on the substrate 102 and pillars or elongated portions 403 may be formed on the substrate 102 to form an aperture 404. The example pillar 402 and the example aperture 404 are to intermesh or interconnect with a respective aperture and/or pillar and/or elongated portion of the optical connectors 106, 107 to couple the substrate 102 to the optical connectors 106, 107. As shown in the example of FIG. 5, through-holes and/or apertures 502 may be formed in the substrate 102 to receive pillars, pins and/or elongated portions of the optical connectors 106, 107 to couple the substrate 102 to the optical connectors 106, 107.

Figure 6:
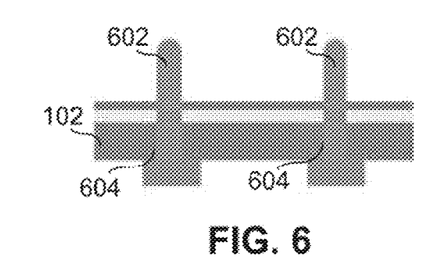
Figure 7:
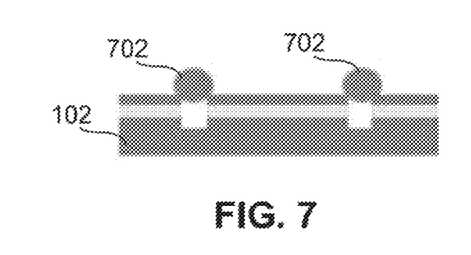

As shown in the example of FIG. 6, pins 602 extend through apertures 604 of the substrate 102. The example pins 602 are received in corresponding apertures of the first and/or second optical connectors 106, 107 to couple the substrate 102 to the optical connectors 106, 107. As shown in the example of FIG. 7, bumps and/or spheres 702 may be formed on the substrate 102 that are to be received in corresponding apertures of the first and/or second optical connectors 106, 107 to couple the substrate 102 and the optical connectors 106, 107. In other examples, the bumps and/or spheres may be similarly formed on the optical connectors 106, 107.

Figure 8:
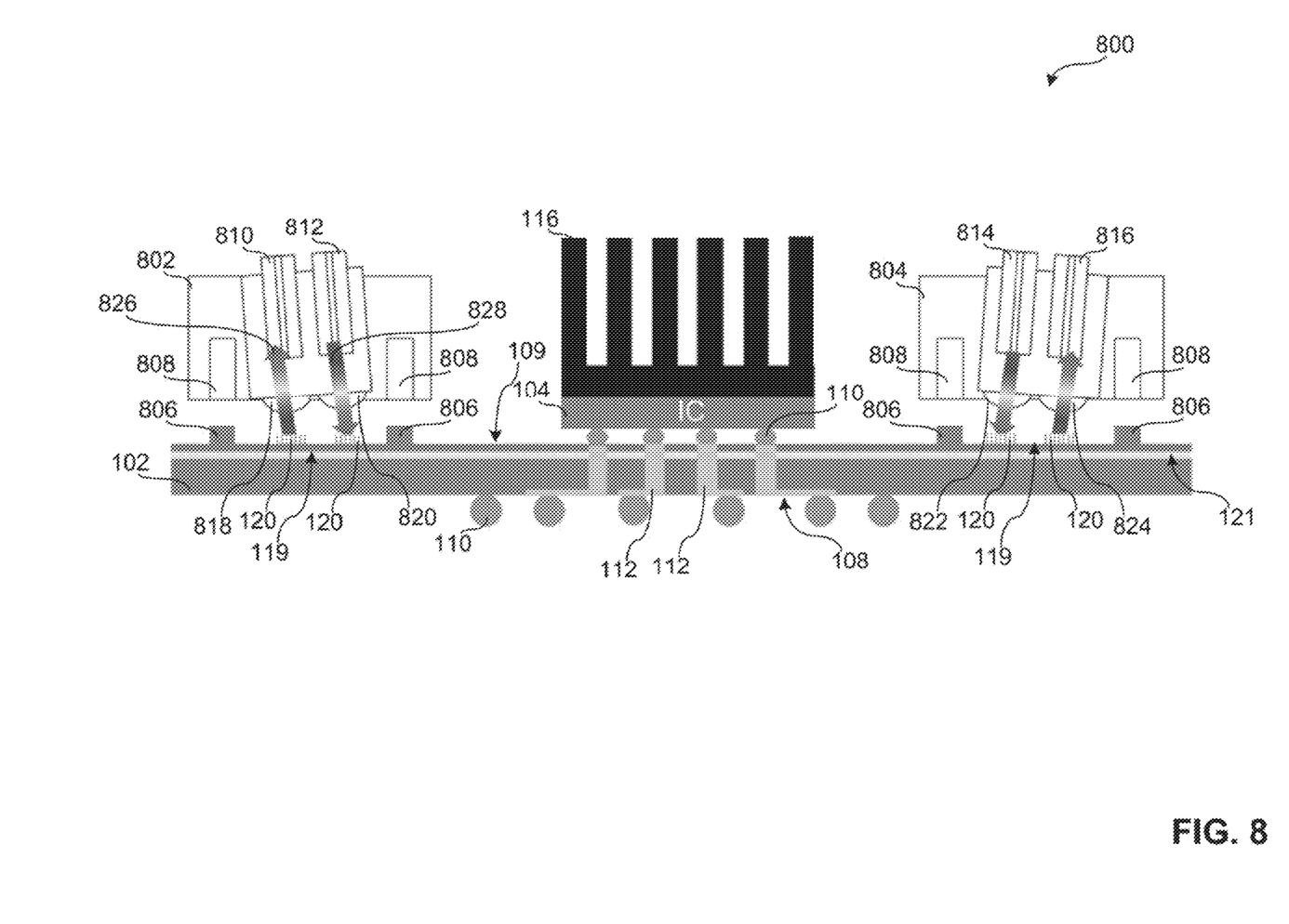
FIG. 8 illustrates an example optical module that can be used to implement the example optical module of FIG. 1.

FIG. 8 illustrates an example optical module 800 that can be used to implement the example optical module 100 of FIG. 1. In the example of FIG. 8, both first and second optical connectors 802, 804 are coupled to the top surface 109 of the substrate 102. In the illustrated example, mating structures are implemented as pillars 806 formed on the substrate 102 and apertures 808 of the respective optical connectors 802, 804. The example apertures 808 receive the example pillars 806 in an interconnecting fashion to couple the optical connectors 802, 804 to the substrate 102. Mechanical elements may strain relieve and fasten the optical connectors 802, 804 to an organic substrate or printed circuit board, for example. In the illustrated example, light guides 124 (FIG. 1) are implemented by positioning optical fibers 810, 812, 814, 816 and corresponding collimating lenses 818, 820, 822, 824 at a non-perpendicular angle relative to the grating couplers 120. As indicated by arrows 826, 828, light may enter and/or exit the optical connectors 106, 107 and/or may enter and/or exit the substrate 102 at a non-perpendicular angle relative to the substrate.

Figure 9:
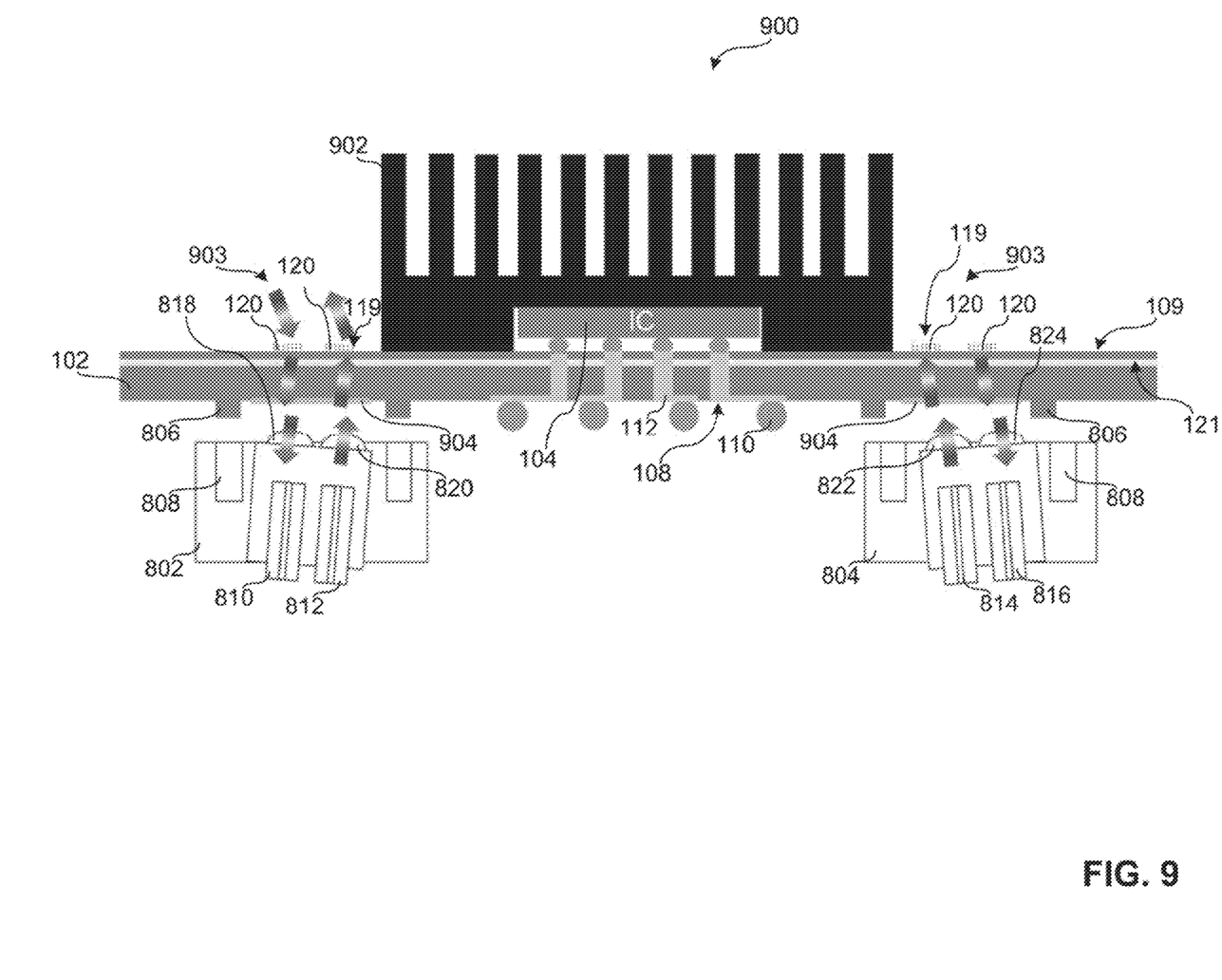
FIG. 9 illustrates another example optical module that can be used to implement the example optical module of FIG. 1.

FIG. 9 illustrates an example optical module 900 that can be used to implement the example optical module 100 of FIG. 1. The example optical module 900 is similar to the example optical module 800 of FIG. 8. However, in contrast to the optical module 800 of FIG. 8, the first and second optical connectors 802, 804 of FIG. 9 are both coupled to the bottom surface 108 of the substrate 102 facilitating use of a relatively larger heat sink 902 capable of substantially encapsulating the integrated circuit 104 and interfacing with the substrate 102. Further, in this example, coupling both of the optical connectors 802, 804 on the bottom surface 108 of the optical module 900 enables using the grating couplers 120 as optical testing points 903 on the top surface 109 of the optical module 900.

In the illustrated example of FIG. 9, to reduce reflection at an interface between the substrate 102 and the optical connectors 802, 804, a coating (e.g., an antireflective coating) 904 is disposed at the interface on the substrate 102 and/or the optical connectors 802, 804. In this example, the light guides 124 (FIG. 1) are implemented by positioning the optical fibers 810, 812, 814, 816 and corresponding collimating lenses 818, 820, 822, 824 at a non-perpendicular angle relative to the grating couplers 120. In some examples, the surface 108 includes an antireflection coating to minimize insertion loss at an interface. The interface may be an air substrate interface.

Figure 10:
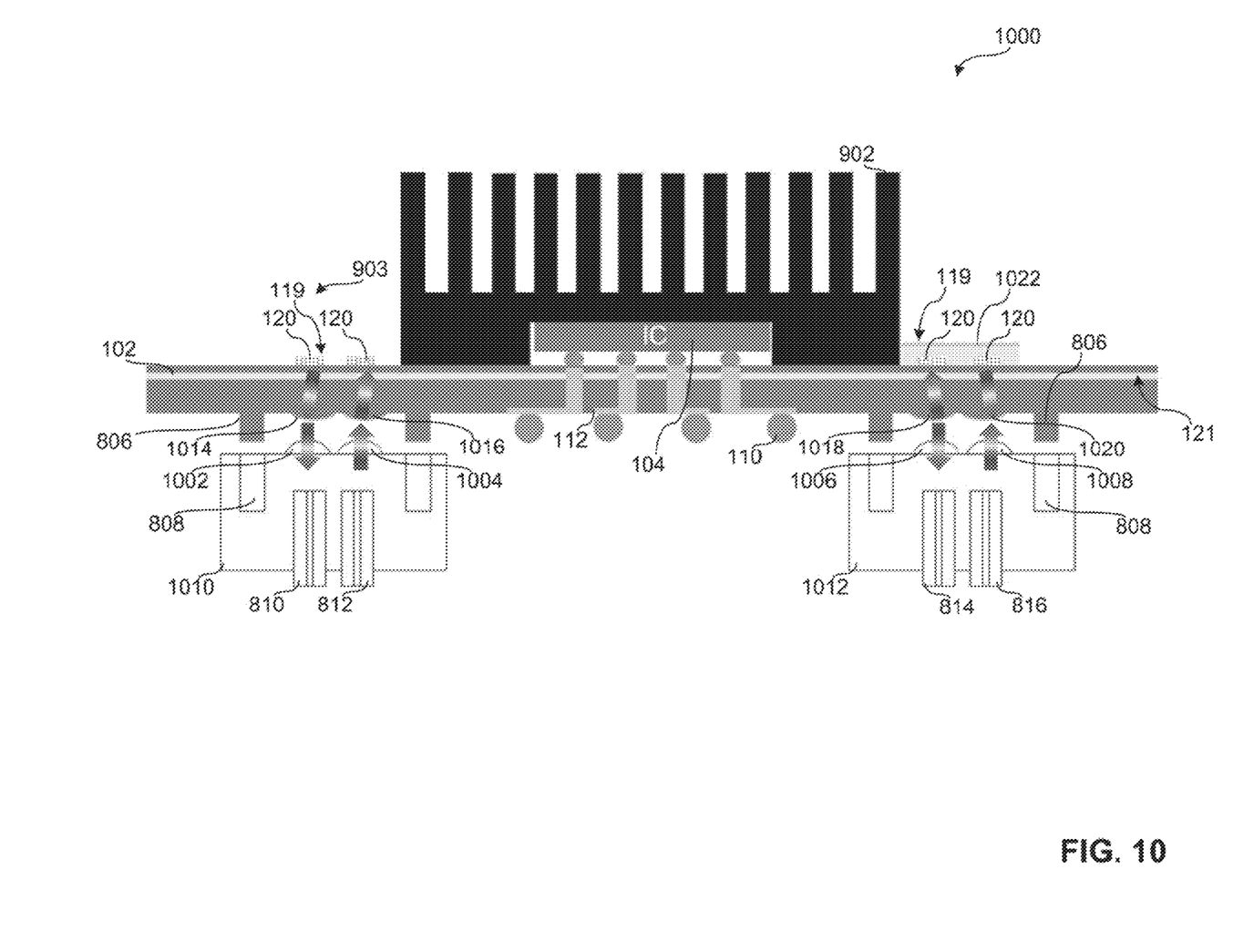
FIG. 10 illustrates another example optical module that can be used to implement the example optical module of FIG. 1.

FIG. 10 illustrates an example optical module 1000 that can be used to implement the example optical module 100 of FIG. 1. The example optical module 1000 is similar to the example optical module 900 of FIG. 9. However, the light guides 124 (FIG. 1) are implemented differently in FIG. 10 than in FIG. 9. To implement the light guides 124 (FIG. 1) of FIG. 10, collimating lenses 1002, 1004, 1006, 1008 of respective first and second optical connectors 1010, 1012 oppose and/or are offset relative to collimating lenses 1014, 1016, 1018, 1020 on the substrate 102. In the illustrated example of FIG. 10, the light guides 124 (FIG. 1) are implemented by opposing ones of the lenses 1002, 1004, 1006, 1008 on the connectors 1010, 1012 and lenses 1014, 1016, 1018, 1020 on the substrate 102. The interaction between the respective lenses 1002, 1004, 1006, 1008, 1014, 1016, 1018, 1020 as the light passes therethrough enables light to enter and/or exit the optical connectors 1010, 1012 substantially perpendicularly but then turns at a non-perpendicular angle with respect to the substrate 102 (e.g., a plane along a length or width of the substrate 102). In some examples, the lenses 1014, 1016, 1018, 1020 of the substrate 102 are coated with an antireflective coating. To increase a light transmission efficiency of the grating couplers 120 and/or to deflect light into the substrate 102, in some examples, a reflector 1022 is disposed over the grating couplers 120. The example reflector 1022 may include silicon dioxide, metal (e.g., gold, silver), a dielectric material and/or distributed Bragg reflectors. The reflector 1022 may be orientated parallel or non-parallel to the grating couplers 120.

Figure 11:
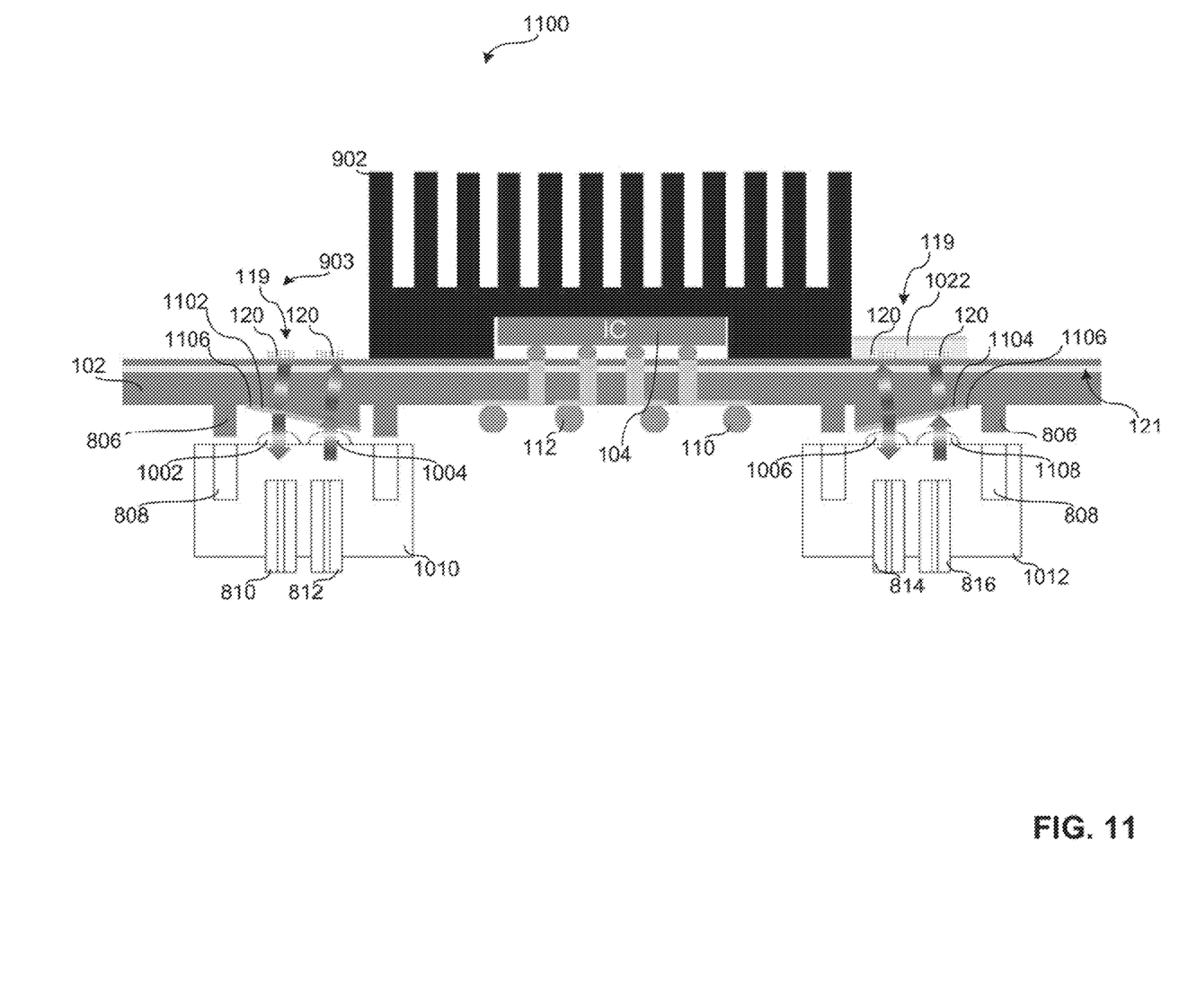
FIG. 11 illustrates another example optical module that can be used to implement the example optical module of FIG. 1.

FIG. 11 illustrates an example optical module 1100 that can be used to implement the example optical module 100 of FIG. 1. The example optical module 1100 is similar to the example optical module 1000 of FIG. 10. However, the light guides 124 (FIG. 1) of FIG. 11 are implemented differently in FIG. 11 than in FIG. 10. To implement the light guides 124 (FIG. 1) in FIG. 11, the substrate 102 includes angled surfaces and/or prism arrays 1102, 1104 that are disposed at a non-parallel angle relative to the grating couplers 120 and/or the lenses 1002, 1004, 1006, 1008 of the respective optical connectors 1010, 1012 to facilitate turning or tilting light as the light enters the substrate 102. In this example, the surfaces 1102, 1104 include a coating (e.g., an antireflective coating) 1106.

Figure 12:
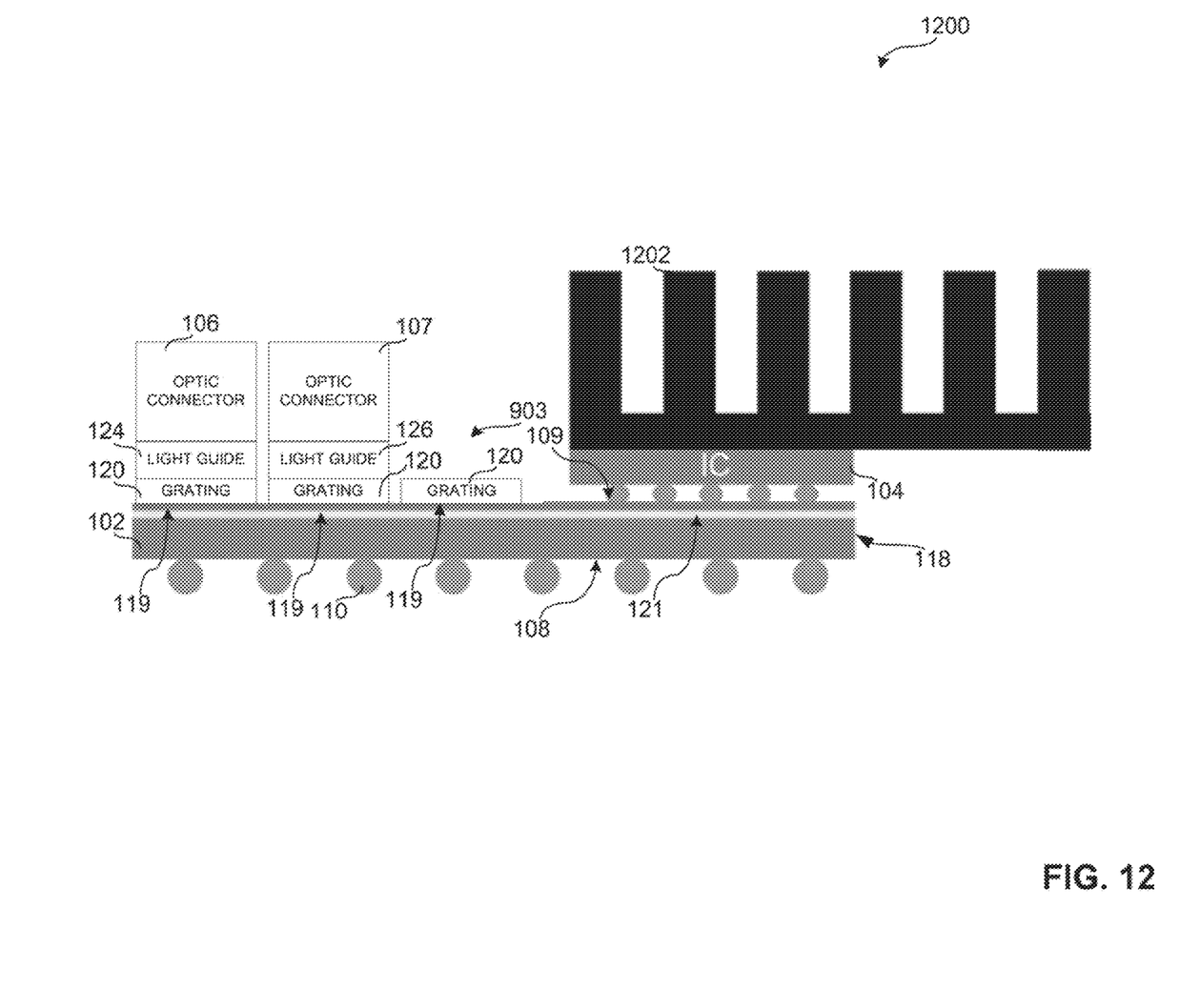
FIG. 12 illustrates another example optical module in accordance with the teachings of this disclosure.

FIG. 12 illustrates an example optical module 1200 that is similar to the example optical module 100 of FIG. 1. However, in contrast to the example optical module 100 of FIG. 1, the example optical module 1200 is illustrated as coupling the first and second optical connectors 106, 107 to the substrate 102 immediately adjacent one another to facilitate mounting the integrated circuit 104 immediately adjacent an edge surface 118 of the optical module 1200. In this example, positioning the integrated circuit 104 immediately adjacent the edge surface 118 facilitates using a relative large heat sink 1202 arranged in a cantilevered configuration extending from the integrated circuit 104. Mechanical components may be implemented to strain relieve the heatsink and fasten the heat sink to an organic substrate or larger printed circuit board, for example.

Examples disclosed herein relate to optical modules including expanded beam optical connectors that can be removably coupled to the substrate of the optical module. Using example optical connectors, light guides, and/or grating couplers disclosed herein enables relaxed alignment tolerances and reduces manufacturing errors (e.g., increasing manufacturing quality) by substantially ensuring that the optical connectors are optically aligned with the grating couplers of the substrate. In some examples, mating features such as interacting male and/or female structures and standoffs facilitate coupling and/or optically aligning the substrate and the optical connector. In the examples disclosed herein, the grating couplers and/or the optical circuits may receive light that enters and/or exits the grating couplers and/or the optical circuits.

As disclosed herein, an optical module includes an optical circuit formed on a substrate to be electrically coupled to an integrated circuit flip chipped onto the substrate, first interconnecting alignment structures formed on the substrate and an optical connector including second interconnecting alignment structures. The optical connector is to be removably coupled to the substrate by interconnecting the first and second interconnecting alignment structures to optically couple the optical connector with the grating coupler array of the optical circuit.

An example optical module includes a substrate comprising an optical circuit, an integrated circuit coupled to the substrate, an optical connector removably optomechanically coupled to the substrate adjacent the grating coupler of the optical circuit. In some examples, the optical connector includes a single mode optical fiber or a multimode optical fiber. In some examples, the grating coupler is a first grating coupler and the optical connector is a first optical connector. If the substrate includes a second grating coupler, the optical module further includes a second optical connector removably coupled to the substrate in optical communication with the second grating coupler.

An example optical module includes an optical circuit formed on a substrate to be electrically coupled to an integrated circuit, first interconnecting alignment structures formed on the substrate and an expanded beam optical connector including second interconnecting alignment structures. The expanded beam optical connector to be removably coupled to the substrate by interconnecting the first and second interconnecting alignment structures to optically couple the expanded beam optical connector with the optical circuit.

An example optical module includes a substrate comprising a grating coupler, an optical connector removably coupled to the substrate adjacent the grating coupler to optically couple the optical connector and the grating coupler and an integrated circuit coupled to the substrate. In some examples, the optical connector includes a single mode optical fiber, a multimode optical fiber, or a multicore fiber. In some examples, the grating coupler is a first grating coupler and the optical connector is a first optical connector. In some examples, the substrate includes a second grating coupler, the optical module further comprising a second optical connector removably coupled to the substrate in optical communication with the second grating coupler.

In some examples, the integrated circuit is disposed between the first and second optical connectors. In some examples, the second optical connector is disposed between the first optical connector and the integrated circuit. In some examples, the optical module includes a heat sink cantilevered from the integrated circuit. In some examples, the optical module also includes a heat sink engaging the integrated circuit and a surface of the substrate. In some examples, an optical fiber of the optical connector is disposed at a non-perpendicular angle relative to the grating coupler to tilt light entering the substrate. In some examples, a surface of the substrate facing the optical connector is disposed at a non-parallel angle relative to the grating coupler to tilt light entering the substrate.

In some examples, the optical module includes a lens on the substrate facing the optical connector to tilt light entering the substrate. In some examples, the integrated circuit and the grating coupler are disposed on a first surface of the substrate and the optical connector is disposed on a second surface of the substrate, the first surface opposing the second surface. In some examples, the grating coupler includes an exposed optical testing point.

An example optical module includes an optical circuit formed on a substrate to be electrically coupled to an integrated circuit, a first interconnecting alignment structure formed on the substrate and an optical connector including a second interconnecting alignment structure, the optical connector to be removably coupled to the substrate by interconnecting the first and second interconnecting alignment structures to optically couple the optical connector with the grating coupler. In some examples, the second interconnecting alignment structure includes an aperture to receive a protrusion of the first interconnecting alignment structure to removably couple the optical connector with the substrate.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An optical module, comprising:
   an optical circuit formed on a substrate to be electrically coupled to an integrated circuit;
   first interconnecting alignment structures formed on the substrate;
   an expanded beam optical connector comprising second interconnecting alignment structures, the expanded beam optical connector to be removably coupled to the substrate by interconnecting the first and second interconnecting alignment structures to optically couple the expanded beam optical connector with the optical circuit, wherein the first interconnecting alignment structures and the second interconnecting alignment structures interconnect with one another at particular positions to passively align the expanded beam optical connector with the optical circuit within an alignment tolerance threshold; and a collimating lens coupled to one end of the expanded beam optical connector and disposed at a non-perpendicular angle relative to the substrate, the substrate being oriented such that the light is coupled within the alignment tolerance threshold into a plane of the substrate to form the optical coupling between the expanded beam optical connector and the optical circuit.

2. An optical module, comprising:
a substrate comprising a first grating coupler;
a first optical connector removably coupled to the substrate adjacent the first grating coupler to optically couple the first optical connector and the first grating coupler;
a mating structure optomechanically coupling the first optical connector to the substrate by aligning the optical connector with the grating coupler within an alignment tolerance threshold;
an integrated circuit coupled to the substrate; and
a first collimating lens coupled to one end of the first optical connector and disposed at a non-perpendicular angle relative to the first grating coupler to tilt light emitted from the first optical connector, the substrate being oriented such that the light is coupled within the alignment tolerance threshold into a plane of the substrate to form the optical coupling between the first optical connector and the optical circuit.

3. The optical module of claim 2, wherein the first optical connector comprises a single mode optical fiber, a multimode optical fiber, or a multicore fiber.

4. The optical module of claim 2, wherein the grating coupler is a first grating coupler and the optical connector is a first optical connector, wherein the substrate comprises a second grating coupler, the optical module further comprising a second optical connector removably coupled to the substrate in optical communication with the second grating coupler further comprising:
a second grating coupler coupled to the substrate;
a second optical connector removably coupled to the substrate in optical communication with the second grating coupler; and
a second collimating lens coupled to one end of the second optical connector and disposed at a non-perpendicular angle relative to the second grating coupler to tilt light emitted from the second optical connector.

5. The optical module of claim 4, wherein the integrated circuit is disposed between the first and second optical connectors.

6. The optical module of claim 4, wherein the second optical connector is disposed between the first optical connector and the integrated circuit.

7. The optical module of claim 6, further comprising a heat sink cantilevered from the integrated circuit.

8. The optical module of claim 2, further comprising a heat sink engaging the integrated circuit and a surface of the substrate.

9. The optical module of claim 2, wherein the first optical fiber of the first optical connector is disposed at a non-perpendicular angle relative to the first grating coupler to tilt the light entering the substrate.

10. The optical module of claim 2, wherein a surface of the substrate facing the first optical connector is disposed at a non-parallel angle relative to the first grating coupler to tilt the light entering the substrate.

11. The optical module of claim 2, wherein the integrated circuit and the first grating coupler are disposed on a first surface of the substrate and the first optical connector is disposed on a second surface of the substrate, the first surface opposing the second surface.

12. The optical module of claim 11, wherein the first grating coupler comprises an exposed optical testing point.

13. An optical module, comprising:
an optical circuit formed on a substrate to be electrically coupled to an integrated circuit;
a first interconnecting alignment structure formed on the substrate;
an optical connector comprising a second interconnecting alignment structure, the optical connector to be removably coupled to the substrate by interconnecting the first and second interconnecting alignment structures to optically couple the optical connector with a grating coupler, wherein the first interconnecting alignment structure and the second interconnecting alignment structure interconnect with one another at particular positions to passively align the optical connector with the grating coupler within an alignment tolerance threshold; and
a collimating lens coupled to one end of the optical connector and disposed at a non-perpendicular angle relative to the grating coupler to tilt light emitted from the optical connector, the substrate being oriented such that the light is coupled within the alignment tolerance threshold into a plane of the substrate and forming the optical coupling between the optical connector and the optical circuit, and
wherein an interface between the substrate and the optical connector comprises a coating disposed on a surface of the substrate facing the optical connector to reduce reflection at the interface.

14. The optical module of claim 13, wherein the second interconnecting alignment structure comprises an aperture to receive a protrusion of the first interconnecting alignment structure to removably couple the optical connector with the substrate.

15. The optical module of claim 1, wherein the substrate includes angled surfaces to tilt the light.

16. The optical module of claim 1, wherein the substrate includes a plurality of prism arrays to tilt the light.

17. The optical module of claim 2, wherein a first optical axis of the light emitted from the first optical connector is offset relative to a second optical axis of the first collimating lens.

18. The optical module of claim 2, wherein the first optical fiber is positioned relative to the first grating coupler.

19. The optical module of claim 4, wherein the second optical connector contains a second optical fiber.

20. The optical module of claim 1, wherein the first interconnecting alignment structures and the second interconnecting alignment structures comprise standoffs that form a spacing between the substrate and the expanded beam optical connector to reduce the insertion loss.

21. The optical module of claim 2, wherein the mating structure comprises standoffs that form a spacing between the substrate and the first optical connector to reduce the insertion loss.

22. The optical module of claim 13, wherein the coating comprises an antireflective coating.

* * * * *